Patented Jan. 12, 1954

2,665,968

UNITED STATES PATENT OFFICE 2,665,968

PROCESS FOR THE PREPARATION OF CYANATES OF ALKALIMETALS FROM UREA AND ALKALINE NITRITES

Felice Bucci, Rome, Italy, assignor to Fondazione Emanuele Paterno, Rome, Italy, a company of Italy No Drawing. Application June 18, 1951, Serial No. 232,248

Claims priority, application Italy July 15, 1950

6 Claims. (Cl. 23—75)

The present invention relates to a process for the preparation of cyanates of alkali metals from urea and alkaline nitrites.

Another object of this invention is the product obtained by the aforementioned process.

It is known that the main use of cyanates consists in their employment in organic synthesis for preparation of ureas and substituted urethanes, semicarbazide and its derivatives, oxyurea, uric acid, etc. The cyanates are also used: for facilitating the charge of cellulosic esters, as cementation agents, in various processes for glass production, for coating metals with protective layers, etc.

For the preparation of salts, particularly of alkaline salts of cyanic acid, many processes are cited in the chemical literature, some of which have been made the object of patents.

A first group of methods is based on wet or dry oxidation of cyanides or ferrocyanides, with the employment of various oxidizing susbtances; but, as cyanides are rather costly products, other methods for the preparation of cyanates have been sought.

According to some patents (Stickstoffwerke, German Patents Nos. 358,194 and 368,520) calcium cyanamide or also dicyandiamide may be reacted with alkaline carbonates or also with other alkaline salts of inorganic acids (sulphides, fluorides; Dutch Pat. No. 47,979).

The methods employing as base substance urea or also mixtures of substances suitable to give urea (ammonia + carbon dioxide) are more numerous and definitely more important: generally the urea is caused to react with alkaline or alkali-earth carbonates (U. S. Patent No. 1,915,425; French Patent No. 695,497; French Patent No. 692,481), but in some cases also other inorganic salts have been used (sulphites, cyanides, sulphides, thiosulphates and their mixtures: French Patent No. 731,167).

The process according to this invention is characterized in that urea is caused to react with alkaline salts of nitrous acid, particularly sodium nitrite and potassium nitrite, which have never been used or proposed for this purpose up to now. The main advantage obtained by substituting, according to the invention, the alkaline salts of nitrous acid for the carbonates or the other aforementioned salts, in the preparation of cyanates starting from urea, is given by the fact that the products obtained by the reaction have already a high degree of purity, and may therefore be used for all or almost all their applications without requiring a subsequent purification by crystallisation, which would cause great losses, also owing to the fact that, as is known, the cyanates are rapidly decomposed in aqueous solution. This advantage is found in a higher ratio particularly in the case of sodium cyanate, which in view of its lower cost is the salt technically more important and which, in order to be obtained in its pure state by the processes based on the employment of sodium carbonate, requires a purification by crystallisation which greatly reduces the yield (see Inorganic Syntheses, vol. II, pp. 88, 89). The reaction brought about by heating the mixture of urea and nitrite may be diagrammatically shown as follows:

$$2NH_2CONH_2 + MNO_2 =$$ 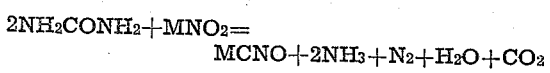
$$MCNO + 2NH_3 + N_2 + H_2O + CO_2$$

(wherein M indicates an alkali metal).

It must be noted that actually during the reaction abundant vapours and smoke are developed, which indicates that in said reaction also more complex volatile products are formed, besides those appearing at the right side of the aforementioned equation.

The yields in alkaline cyanate, except possible minor losses during the treatment, are quantitative.

Following is a description of the process in two referred embodiments, respectively for the preparation of sodium cyanate and of potassium cyanate.

Sodium cyanate

Dry urea and dry sodium nitrite are intimately mixed together in the ratio of two moles of urea for one mole of nitrite. As said mixture reacts under heat very strongly and with a great evolution of gases, smoke, and vapours, it is convenient to cause the reaction to proceed little by little, by gradually projecting the mixture onto a surface, preferably of porcelain or "grès" kept at a temperature of 210–220° C. The gaseous ammonia developing during the reaction may be collected and utilized in one of the known and common methods. The solid product of the reaction is still kept for one or more hours at the temperature of 210–220° C. until the evolution of ammonia ceases. Then the product, which is white with a slight hazel-color shade, is collected and finely mixed with 0.4 mole of urea. The mixture, in a porcelain or "grès" crucible is kept in a stove or muffle furnace controlled at 180–190° C., for one or more hours, until the evolution of ammonia is no longer observed.

Then the furnace temperature is gradually raised to 530° C. The product is then coarsely ground and then kept in the furnace controlled at 530° C., for an hour or for a longer period, until its aqueous solution with a solution of cobalt nitrate gives a clear blue liquid.

In order to obtain a pure product, it is necessary that the furnace temperature should not be higher than above indicated (530° C.). By operating at higher temperatures, the pyrogenic decomposition of the sodium cyanate becomes appreciable, with formation of sodium carbonate.

The product obtained by the above described process is a crystalline product, slightly aggregated, white, and has a high degree of purity. The yield in respect of the used sodium nitrite is practically quantitative.

*Potassium cyanate*

As potassium cyanate melts at a temperature noticeably lower than sodium cyanate, the features of the process indicated for sodium cyanate (heating of the product of the first reaction in a furnace at a temperature slightly lower than the melting temperature of sodium cyanate) may be conveniently modified by heating the product of the first reaction of urea with the potassium nitrite at a temperature sufficient for causing the melting of the product: in fact, as potassium cyanate melts, as aforesaid, at a temperature noticeably lower than the corresponding sodium salt, its decomposition to carbonate, in the molten state, is also far less appreciable. The particulars for carrying out this process may be conveniently the following.

A fine mixture of dry urea and dry potassium nitrite, in the ratio of two moles of urea for one mole of nitrite, is projected little by little onto a surface, preferably of porcelain or "grès," kept at 210-220° C., as for the sodium cyanate. Also in this case the reaction is very strong, with abundant evolution of ammonia and of smoke and vapours, and swelling of the mass under reaction, which then immediately becomes solidified. The reaction product is still kept at 220° C. until the ammonia evolution ceases, then it is finely mixed with 0.3-0.4 mole of urea and gradually heated in a large container of porcelain or "grès," at a temperature somewhat higher than the melting point of potassium cyanate (330° C.). The mixture softens, swells and boils, evolving ammonia, and finally totally melts, and from its mass many gaseous bubbles are evolved: the heating must be interrupted when said bubbles have practically ceased, and the molten mass, at first very turbid, has become almost completely clear, slightly brown coloured.

In order to eliminate the slight quantities of carbonate which may have been formed, an addition can be made to the molten mass of a further very small quantity of urea up to a maximum of 0.1 mole, subdividing said addition onto several successive portions and stirring each time the mass under reaction.

The solidified product is white; the yield is practically quantitative.

Obviously, the scope of this patent is not restricted and limited to the aforementioned forms of this process. The invention consists essentially in causing the urea to react with alkali salts of nitrous acid, in order to obtain salts of cyanic acid.

The scope of this invention includes all the modalities under which said reactions are carried out, as well as the various proportions of the substances caused to react or the other conditions of temperature and pressure during the treatment and is not limited by any particular variation not affecting the principle of the invention.

For instance, the process can be carried out in a medium of inert gas, or by adding the urea to the nitrite in a single time instead of two as described, or by adding gradually the urea to the molten nitrite, or the nitrite to the molten urea, or by varying in whatever different way the execution modalities of the reaction (urea+nitrite=cyanate) without thus departing from the scope of this invention.

I claim:

1. A process of preparing sodium cyanate comprising mixing urea and sodium nitrite in the dry state in a ratio of about 2 mols of urea for 1 mol of sodium nitrite, contacting said mixture, portionwise, onto an inert heated solid surface maintained at a temperature of about 210-220° C. for a sufficient period of time to heat said mixture to the temperature of said solid surface and until the evolution of ammonia from such heating ceases, thereafter collecting the product which has been contacted at said solid surface and mixing it with an additional small quantity of urea, heating the mixture in a vitreous crucible at a temperature of about 180-190° C. until ammonia is no longer evolved therefrom, raising the temperature of the so-heated mixture to about 530° C., and grinding the mixture at a temperature of about 530° C. for a sufficient period of time to provide a test of an aqueous solution of the so-treated mixture with a cobalt nitrate solution to give a clear blue solution and to thereby obtain a crystalline product of a high degree of purity.

2. A process as in claim 1 wherein the mixture is treated at about 530° C. for at least 1 hour.

3. A process of preparing alkali metal cyanates comprising mixing urea and alkali metal nitrite in the dry state in a ratio of about 2 mols of urea for 1 mol of alkali metal nitrite, contacting said mixture, portionwise, onto an inert heated solid surface maintained at a temperature of about 210-220° C. for a sufficient period of time to heat said mixture to the temperature of said solid surface and until the evolution of ammonia from such heating ceases, thereafter collecting the product which has been contacted at said solid surface and mixing it with an additional small quantity of urea, heating the mixture in a vitreous crucible at a temperature of about 180-190° C. until ammonia is no longer evolved therefrom, raising the temperature of the so-heated mixture to about 530° C., and grinding the mixture at a temperature of about 530° C. for a sufficient period of time to provide a test of an aqueous solution of the so-treated mixture with a cobalt nitrate solution to give a clear blue solution and to thereby obtain a crystalline product of a high degree of purity.

4. A process of preparing potassium cyanate comprising mixing urea and potassium nitrite in the dry state in a ratio of about 2 mols of urea for 1 mol of potassium nitrite, contacting said mixture, portionwise, onto an inert heated solid surface maintained at a temperature of about 210-220° C. for a sufficient period of time to heat said mixture to the temperature of said solid surface and until the evolution of ammonia from such heating ceases, thereafter collecting the product which has been contacted at said solid surface and mixing it with an additional small quantity of urea, heating the mixture in a vitreous crucible to a temperature higher than the melting temperature of potassium cyanate until ammonia is no longer evolved therefrom, raising the temperature of the so-heated mixture to above about 330° C., and grinding the mixture at a temperature of above about 330° C. for a sufficient period of time to provide a test of an aqueous solution of the so-treated mixture with a cobalt nitrate solution to give a clear blue solution and to thereby obtain a crystalline product of a high degree of purity.

5. A process of preparing alkali metal cyanates comprising reacting a mixture of about 2 mols of urea and about 1 mol of alkali metal nitrite in the dry state, contacting said mixture portionwise onto a heated surface at a temperature of about 210–220° C. for a period of time to complete evolution of ammonia from the mixture at this temperature, adding to the so-heated product an additional amount of about 0.3 to about 0.4 mol of urea and heating this mixture gradually to a temperature higher than the melting point of the alkali metal cyanate produced until the evolution of ammonia ceases above this melting temperature, and stirring the mixture at this temperature whereby a crystalline metal cyanate is obtained.

6. A process for preparing potassium cyanate comprising preparing a mixture of about 2 mols of urea and about 1 mol of potassium nitrite in the dry state, contacting said mixture portionwise onto an inert surface heated to a temperature of about 210–220° C. for a period of time until the evolution of gases ceases, mixing the so-treated product with an additional amount of about 0.4 mol of urea, heating the mixture in a vitreous container to a temperature above about 330° C., the melting temperature of potassium cyanate, for a period of time until the evolution of gas from the heated product ceases, adding an additional amount of urea to the so-treated mixture up to 0.1 mol and continuing the heating of the mixture at this temperature under stirring until the evolution of gases ceases, whereby potassium cyanate is obtained.

FELICE BUCCI.

References Cited in the file of this patent

UNITED STATES PATENTS

| Number | Name | Date |
|---|---|---|
| 1,915,425 | Kloepter | June 27, 1933 |
| 1,971,009 | Konig | Aug. 21, 1934 |
| 2,345,826 | Neumark | Apr. 4, 1944 |

FOREIGN PATENTS

| Number | Country | Date |
|---|---|---|
| 339,220 | Great Britain | Dec. 4, 1930 |

OTHER REFERENCES

Scattergood: "Inorganic Syntheses," vol. II, 1946, pages 86–90, McGraw-Hill Book Co., N. Y. C.